(12) United States Patent
Suzuki (10) Patent No.: US 8,775,004 B2
(45) Date of Patent: Jul. 8, 2014

(54) VEHICLE, CONTROL METHOD, AND COMPUTER PROGRAM

(75) Inventor: Masahiro Suzuki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/819,470

(22) PCT Filed: Oct. 20, 2011

(86) PCT No.: PCT/JP2011/074163
§ 371 (c)(1),
(2), (4) Date: Feb. 27, 2013

(87) PCT Pub. No.: WO2012/053594
PCT Pub. Date: Apr. 26, 2012

(65) Prior Publication Data
US 2013/0166130 A1    Jun. 27, 2013

(30) Foreign Application Priority Data

Oct. 22, 2010  (JP) ................................. 2010-237802

(51) Int. Cl.
*G06F 17/00* (2006.01)
*B60W 10/08* (2006.01)
*B60W 20/00* (2006.01)
*B60W 10/06* (2006.01)
*B60K 6/48* (2007.10)
*B60L 11/18* (2006.01)

(52) U.S. Cl.
CPC ............... *B60W 10/08* (2013.01); *B60W 20/00* (2013.01); *B60W 10/06* (2013.01); *B60K 6/48* (2013.01); *B60L 11/18* (2013.01); *Y02T 10/6221* (2013.01); *Y10S 903/903* (2013.01); *Y10S 903/93* (2013.01)
USPC ............. 701/22; 701/102; 903/903; 903/930; 18/65.23; 18/65.265

(58) Field of Classification Search
CPC ..... B60W 20/00; B60W 10/08; B60W 10/06; B60W 20/20; B60W 2710/0666; B60W 2710/083; B60W 10/26; B60W 2510/083; B60W 2540/103; B60W 2510/0657; B60W 2710/0677; B60W 2710/1061; B60K 2025/005; B60K 6/48; B60K 6/547; Y02T 10/6221; B60L 3/00; B60L 11/14
USPC .......... 701/22, 102; 903/903, 930; 180/65.23, 180/65.265

See application file for complete search history.

(56) References Cited

U.S. PATENT DOCUMENTS 6,209,672 B1 * 4/2001 Severinsky ................. 180/65.23
2012/0245781 A1 * 9/2012 Kanamori et al. ............. 701/22

(Continued)

FOREIGN PATENT DOCUMENTS

JP     2009-106000 A    5/2009

OTHER PUBLICATIONS

The above reference was cited in the International Search Report of the corresponding International Application, PCT/JP2011/074163 dated Dec. 13, 2011, which is enclosed.

*Primary Examiner* — McDieunel Marc
(74) *Attorney, Agent, or Firm* — Cowan, Liebowitz & Latman, P.C.; Mark Montague (57) ABSTRACT

The vehicle smoothly generates the torque requested by the driver. The vehicle includes an elapsed time measurement unit, a torque limit value deciding unit, and an electric motor torque control unit. The elapsed time measurement unit measures the time elapsed since the vehicle has started moving in an EV mode, in which travel or starting is performed only with the drive force of an electric motor. The torque limit value deciding unit decides a torque limit value of the electric motor by means of the time elapsed since starting and the acceleration opening amount originating from the driver's instructions. The electric motor torque control unit controls the electric motor so as to limit the torque of the electric motor to or below the limit value. The disclosed control method is used in hybrid vehicles.

5 Claims, 5 Drawing Sheets

(56) References Cited

U.S. PATENT DOCUMENTS

| | | | |
|---|---|---|---|
| 2013/0131901 A1* | 5/2013 | Yamagata et al. | 701/22 |
| 2013/0131903 A1* | 5/2013 | Araki | 701/22 |
| 2013/0158768 A1* | 6/2013 | Sawayama | 701/22 |
| 2013/0158769 A1* | 6/2013 | Sawayama | 701/22 |
| 2013/0158770 A1* | 6/2013 | Araki | 701/22 |
| 2013/0158843 A1* | 6/2013 | Kokon | 701/112 |
| 2013/0184921 A1* | 7/2013 | Ueno | 701/22 |
| 2013/0184922 A1* | 7/2013 | Kabe | 701/22 |
| 2013/0197735 A1* | 8/2013 | Ueno | 701/22 |
| 2013/0274976 A1* | 10/2013 | Suzuki | 701/22 |

* cited by examiner

Fig.6

VEHICLE, CONTROL METHOD, AND COMPUTER PROGRAM

CROSS REFERENCE TO RELATED APPLICATIONS

This is a U.S. national stage of application No. PCT/JP2011/074163, filed on Oct. 20, 2011. Priority under 35 U.S.C. §119(a) and 35 U.S.C. §365(b) is claimed from Japanese Patent Application No. 2010-237802, filed on Oct. 22, 2010, the disclosure of which are also incorporated herein by reference.

TECHNICAL FIELD

The present invention relates to a vehicle, a control method, and a computer program.

BACKGROUND ART

A so-called hybrid vehicle that is driven by an internal combustion engine and an electric motor has been focused. In the hybrid vehicle, the electric motor functions as a generator to regenerate electric power and store the electric power during deceleration. The stored electric power is utilized to generate driving force for accelerating the vehicle or driving the vehicle.

Some hybrid vehicles have an automatic transmission. The automatic transmission is also referred to as a transmission below.

In this case, a clutch that transmits power or cuts the transmission of power can be provided between the internal combustion engine and the electric motor.

There has conventionally been proposed a parallel-hybrid vehicle (see, for example, Patent Literature 1). The parallel-hybrid vehicle described above includes a battery temperature sensor and an HVECU that detect a battery condition; a vehicle speed sensor, an engine rotational speed sensor, and an accelerator pedal position sensor that sense a vehicle condition; and an FI/AT/MGECU that changes required values of an engine and a motor based upon the accelerator pedal position, and determines whether fuel supply to the engine is stopped or not from the vehicle condition. When the vehicle currently reduces its speed, and the accelerator pedal position is not more than a predetermined opening amount, the parallel-hybrid vehicle keeps a fuel-cut state, and controls the target torque required based upon the accelerator pedal position by a MOTECU until the accelerator pedal position reaches a predetermined position.

CITATION LIST

Patent Literature

PTL1: JP 2005-291206 A

SUMMARY OF INVENTION

Technical Problem

However, when a driver starts the vehicle only by the driving force from the electric motor, abrupt torque might be generated in response to an amount of depressing an accelerator pedal (or an accelerator opening amount) by the driver, since the torque response of the electric motor is relatively better than the torque response of the internal combustion engine. Accordingly, shock or surge in a power line system might be generated.

Because the torque response of the electric motor is better than the torque response of the internal combustion engine, it is difficult for the driver to make the delicate torque control by the depression of the accelerator pedal during when the vehicle runs very slowly, compared to the case in which the vehicle runs only with the internal combustion engine.

In view of the above-mentioned circumstance, the present invention aims to solve the foregoing problem, i.e., to provide a vehicle, a control method, and a computer program that can realize the acceleration required by the driver as much as possible while reducing shock, in other words, that can smoothly generate torque required by the driver.

Solution to Problem

In order to solve the above-mentioned problem, according to an aspect of the present invention, a vehicle that is driven by a power source including an electric motor, includes: a measurement unit that measures a starting elapsed time that is a time elapsed after the vehicle starts, when the vehicle is driven only by power of the electric motor; a decision unit that decides a limit value of torque of the electric motor based upon the starting elapsed time and an accelerator opening amount instructed by a driver; and a control unit that controls the electric motor to limit the torque of the electric motor to be not more than the limit value.

According to the aspect of the present invention, in the vehicle described above, the decision unit decides the limit value to be larger, as the starting elapsed time has elapsed.

According to the aspect of the present invention, in the vehicle described above, the decision unit decides the limit value based upon one of a predetermined number of levels of the accelerator opening amount and the starting elapsed time.

According to the aspect of the present invention, the vehicle described above further includes a storage unit that stores the limit value in association with the starting elapsed time and the level of the accelerator opening amount, in which the control unit controls the electric motor in order that the torque of the electric motor is limited to a value not more than the stored limit value that is associated with the starting elapsed time and the level of the accelerator opening amount.

According to another aspect of the present invention, a control method of a vehicle that is driven by a power source including an electric motor includes: a measurement step for measuring a starting elapsed time that is a time elapsed after the vehicle starts, when the vehicle is driven only by power of the electric motor; a decision step for deciding a limit value of torque of the electric motor based upon the starting elapsed time and an accelerator opening amount instructed by a driver; and a control step for controlling the electric motor to limit the torque of the electric motor to be not more than the limit value.

According to other aspect of the present invention, a computer program causes a computer, which controls a vehicle that is driven by a power source including an electric motor, to execute: a measurement step for measuring a starting elapsed time that is a time elapsed after the vehicle starts, when the vehicle is driven only by power of the electric motor; a decision step for deciding a limit value of torque of the electric motor based upon the starting elapsed time and an accelerator opening amount instructed by a driver; and a control step for controlling the electric motor to limit the torque of the electric motor to be not more than the limit value.

Advantageous Effects of Invention

According to one aspect of the present invention, a vehicle, a control method, and a computer program that can smoothly generate torque required from a driver can be provided.

DESCRIPTION OF EMBODIMENTS

A hybrid vehicle according to one embodiment of the present invention will be described below with reference to FIGS. 1 to 5.

Figure 1:
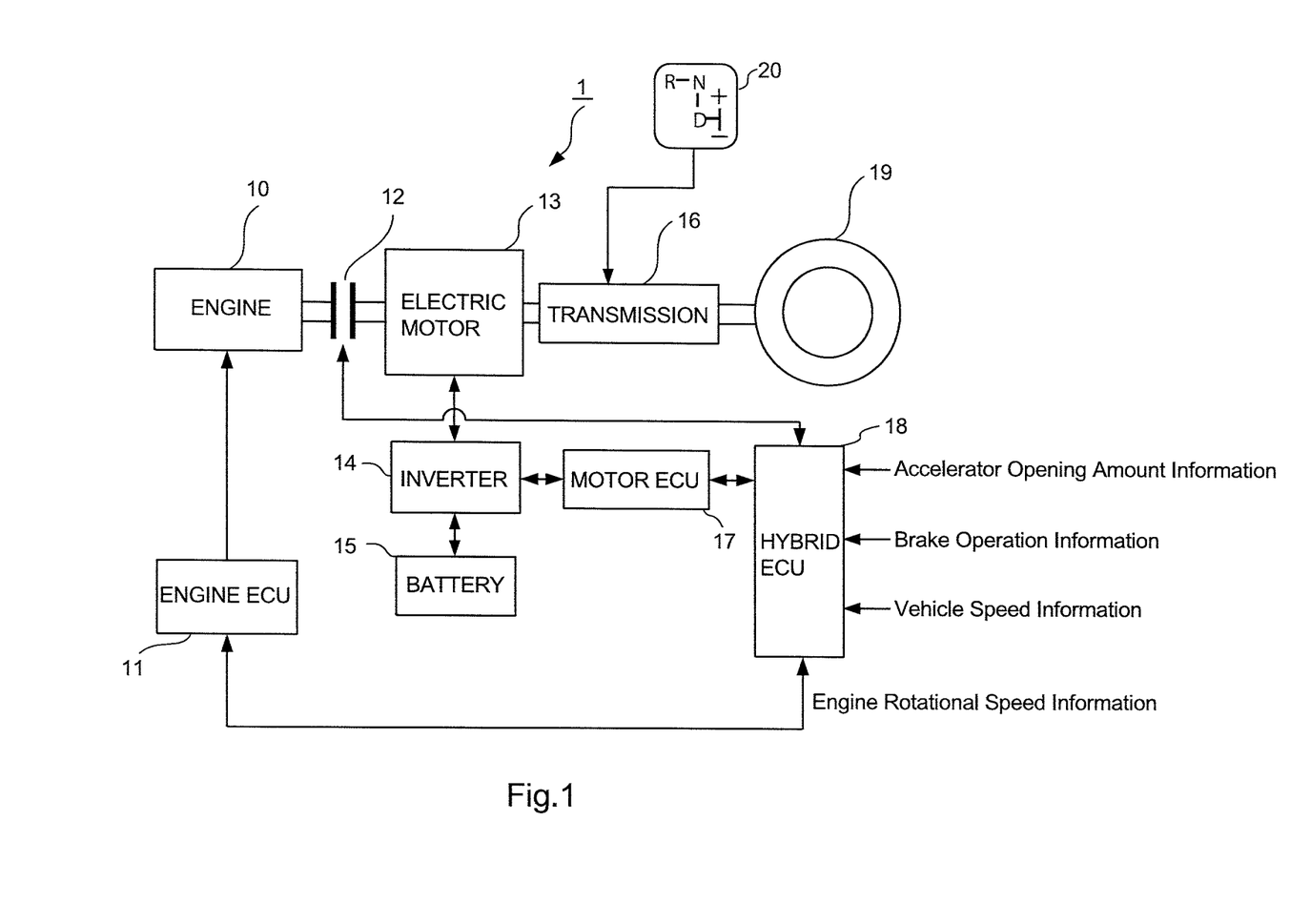
FIG. 1 is a block diagram illustrating an example of a configuration of a hybrid vehicle 1.

FIG. 1 is a block diagram illustrating an example of a configuration of a hybrid vehicle 1. The hybrid vehicle 1 is one example of a vehicle. The hybrid vehicle 1 is driven by an internal combustion engine and/or an electric motor via an automatic transmission, and when the vehicle 1 reduces its speed, electric power can be regenerated by the electric motor. The automatic transmission is referred to as a semiautomatic transmission. It has the same configuration as a manual transmission, but can realize an automatic shift operation.

The hybrid vehicle 1 includes an engine 10, an engine ECU (Electronic Control Unit) 11, a clutch 12, an electric motor 13, an inverter 14, a battery 15, a transmission 16, a motor ECU 17, a hybrid ECU 18, a wheel 19, and a shift unit 20. The transmission 16 has the above-mentioned semiautomatic transmission, and is operated by the shift unit 20 having a drive range (hereinafter referred to as D (Drive) range).

The engine 10 is one example of the internal combustion engine. It is controlled by the engine ECU 11 to burn gasoline, light gas oil, CNG (Compressed Natural Gas), LPG (Liquefied Petroleum Gas), or alternate fuel therein, thereby generating power for rotating a shaft. It then transmits the generated power to the clutch 12.

The engine ECU 11 is a computer that works in conjunction with the motor ECU 17 in accordance with an instruction from the hybrid ECU 18. It controls the engine 10, i.e., controls the fuel injection amount or valve timing. For example, the engine ECU 11 is composed of a CPU (Central Processing Unit), ASIC (Application Specific Integrated Circuit), microprocessor (microcomputer), and DSP (Digital Signal Processor), and includes a calculation unit, a memory, and an I/O (Input/Output) port.

The clutch 12 is controlled by the hybrid ECU 18, and transmits a shaft output from the engine 10 to the wheel 19 via the electric motor 13 and the transmission 16. Specifically, the clutch 12 mechanically connects the rotation shaft of the engine 10 and the rotation shaft of the electric motor 13 to transmit the shaft output of the engine 10 to the electric motor 13, or cuts the mechanical connection between the rotation shaft of the engine 10 and the rotation shaft of the electric motor 13 to allow the rotation shaft of the engine 10 and the rotation shaft of the electric motor 13 to rotate with a different rotational speed, under the control of the hybrid ECU 18.

For example, the clutch 12 mechanically connects the rotation shaft of the engine 10 and the rotation shaft of the electric motor 13, when the hybrid vehicle 1 runs by the power from the engine 10, by which the electric motor 13 generates electric power; when the engine 10 is assisted by the driving force of the electric motor 13; and when the engine 10 is started by the electric motor 13.

For example, the clutch 12 cuts the mechanical connection between the rotation shaft of the engine 10 and the rotation shaft of the electric motor 13, when the engine 10 is stopped or in an idling condition, and the hybrid vehicle 1 runs with the driving force of the electric motor 13, or when the engine 10 is stopped or in an idling condition, the hybrid vehicle 1 reduces its speed, or runs on a downhill, and the electric motor 13 generates electric power (regenerates electric power).

The clutch 12 is different from a clutch that is operated by the driver's operation on a clutch pedal, and it is operated by the control of the hybrid ECU 18.

The electric motor 13 is a so-called motor generator, and it generates power for rotating a shaft by electric power supplied from the inverter 14, and supplies the shaft output to the transmission 16. Alternatively, the electric motor 13 generates electric power by the power for rotating the shaft supplied from the transmission 16, and supplies the electric power to the inverter 14. For example, when the hybrid vehicle 1 increases its speed, or runs with a constant speed, the electric motor 13 generates power for rotating the shaft, and supplies the shaft output to the transmission 16, thereby allowing the hybrid vehicle 1 to run in cooperation with the engine 10. For example, when the electric motor 13 is driven by the engine 10, or when the hybrid vehicle 1 runs without using power, such as in the case where the hybrid vehicle 1 reduces its speed or runs on a downhill, the electric motor 13 operates as a motor generator. In this case, the electric motor 13 generates electric power by the power for rotating the shaft supplied from the transmission 16, and supplies the electric power to the inverter 14, whereby the battery 15 is charged.

The inverter 14 is controlled by the motor ECU 17, and it converts DC voltage from the battery 15 into AC voltage, or converts AC voltage from the electric motor 13 to DC voltage. When the electric motor 13 generates power, the inverter 14 converts the DC voltage from the battery 15 into AC voltage so as to supply the electric power to the electric motor 13. When the electric motor 13 generates electric power, the inverter 14 converts the AC voltage from the electric motor 13 into DC voltage. In other words, in this case, the inverter 14 functions as a rectifier or a voltage regulation device for feeding DC voltage to the battery 15.

The battery 15 is a secondary cell capable of being charged and discharged. It feeds electric power to the electric motor 13 through the inverter 14 when the electric motor 13 generates power, or it is charged by the electric power generated from the electric motor 13 when the electric motor 13 generates electric power.

The transmission 16 has a semiautomatic transmission (not illustrated) for selecting any one of plural gear ratios (transmission gear ratios) in accordance with an instruction signal to shift from the hybrid ECU 18. It changes the transmission gear ratio, and transmits the shifted power of the engine 10 and/or the shifted power of the electric motor 13 to the wheel 19. When the vehicle reduces its speed, or runs on the downhill, the transmission 16 transmits power from the wheel 19 to the electric motor 13. The transmission 16 changes gear to bring the vehicle 1 into a driving state in which power is transmitted, into a so-called neutral state in which the transmission of power is cut, or into a reverse state, by the driver's operation on the shift unit 20 for selecting a drive range (D range), a neutral range, or a reverse range. In the semiautomatic transmission, the driver can manually change the gear position to an arbitrary gear number by operating the shift unit 20.

The motor ECU 17 is a computer that works in conjunction with the engine ECU 11 in accordance with an instruction from the hybrid ECU 18. It controls the electric motor 13 by controlling the inverter 14. For example, the motor ECU 17 is composed of a CPU, ASIC, microprocessor (microcomputer), and DSP, and includes a calculation unit, a memory, and an I/O port.

The hybrid ECU 18 is one example of a computer. It acquires accelerator opening amount information, brake operation information, vehicle speed information, and engine rotational speed information acquired from the engine ECU 11, and controls the clutch 12 by referring to the acquired information. The hybrid ECU 18 issues an instruction to control the electric motor 13 and the inverter 14 to the motor ECU 17, and issues an instruction to control the engine 10 to the engine ECU 11. For example, the hybrid ECU 18 is composed of a CPU, ASIC, microprocessor (microcomputer), and DSP, and includes a calculation unit, a memory, and an I/O port.

A computer program executed by the hybrid ECU 18 is stored beforehand into a non-volatile memory in the hybrid ECU 18, whereby the computer program can preliminarily be installed to the hybrid ECU 18 that is a computer.

The engine ECU 11, the motor ECU 17, and the hybrid ECU 18 are interconnected with a bus in accordance with a standard such as CAN (Control Area Network).

The wheel 19 is a driving wheel that transmits driving force to a road surface. Although FIG. 1 illustrates only one wheel 19, the hybrid vehicle 1 actually includes plural wheels 19.

Figure 2:
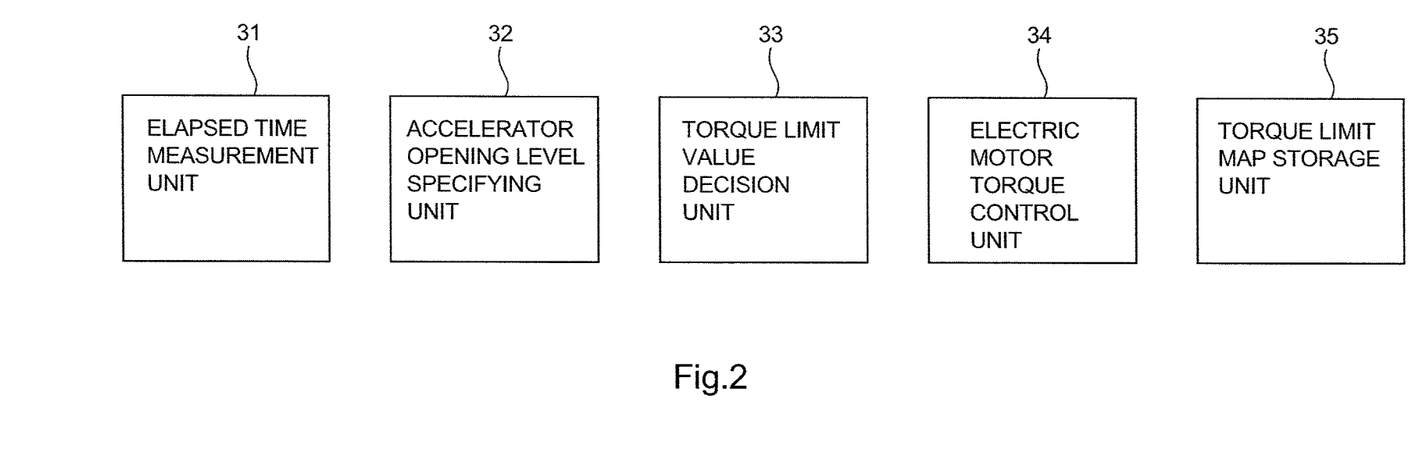
FIG. 2 is a block diagram illustrating an example of a configuration of functions realized in a hybrid ECU 18.

FIG. 2 is a block diagram illustrating an example of a configuration of functions realized in the hybrid ECU 18 that executes the computer program. When the hybrid ECU 18 executes the computer program, an elapsed time measurement unit 31, an accelerator opening level specifying unit 32, a torque limit value decision unit 33, an electric motor torque control unit 34, and a torque limit map storage unit 35 are realized.

The elapsed time measurement unit 31 measures an elapsed time (hereinafter referred to as a starting elapsed time) since the vehicle 1 starts running with the state (hereinafter referred to as an EV mode) in which the vehicle 1 runs or starts only by the driving force (torque) of the electric motor 13, by use of a real-time clock or a counter in the hybrid ECU 18. The accelerator opening level specifying unit 32 specifies the level of the accelerator opening amount according to the current accelerator opening amount, out of the predetermined number of levels. For example, when the full accelerator opening amount is defined as 100%, the accelerator opening level specifying unit 32 specifies that the level of the accelerator opening amount is 0 when the current accelerator opening amount is 0% to 34%, that the level of the accelerator opening amount is 1 when the current accelerator opening amount is 35% to 59%, that the level of the accelerator opening amount is 2 when the current accelerator opening amount is 60% to 79%, and that the level of the accelerator opening amount is 3 when the current accelerator opening amount is 80% or more.

The torque limit value decision unit 33 decides the torque limit value of the electric motor 13 based upon the starting elapsed time and the accelerator opening amount instructed by the driver. For example, the torque limit value decision unit 33 decides the torque limit value of the electric motor 13 based upon the starting elapsed time and the specified level of the accelerator opening.

The electric motor torque control unit 34 issues an instruction to control the electric motor 13 and the inverter 14 to the motor ECU 17, thereby controls the electric motor 13 to generate desired torque.

The torque limit map storage unit 35 stores a torque limit map in which the torque limit values of the electric motor 13 are plotted according to each level of the accelerator opening amount and the starting elapsed time.

In the torque limit map, the level of the accelerator opening amount for the current accelerator opening amount and the limit value of the torque (hereinafter merely referred to as a torque limit value) of the electric motor 13 according to each level of the accelerator opening amount and the starting elapsed time are plotted.

For example, the torque limit map describes data of threshold values for specifying the current accelerator opening of less than 35% as the accelerator opening level 0, specifying the current accelerator opening of 35% or more to less than 60% as the accelerator opening level 1, specifying the current accelerator opening of 60% or more to less than 80% as the accelerator opening level 2, and specifying the current accelerator opening of 80% or more as the accelerator opening level 3.

Figure 3:
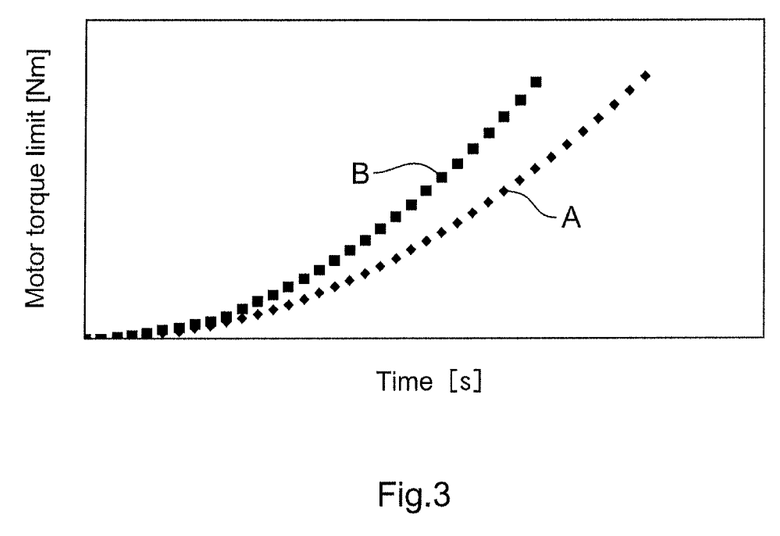
FIG. 3 is a view illustrating a change in a torque limit value to a starting elapsed time.

FIG. 3 is a view illustrating a change in the torque limit value to the starting elapsed time. In FIG. 3, a vertical axis indicates the torque limit value, and a horizontal axis indicates the starting elapsed time. In FIG. 3, a dotted line of A indicates the torque limit value according to the starting elapsed time in the accelerator opening level 0, while a dotted line of B indicates the torque limit value according to the starting elapsed time in the accelerator opening level 1.

As illustrated in FIG. 3, the torque limit value becomes larger with the lapse of the starting elapsed time. When the starting elapsed time is the same, the torque limit value in the accelerator opening level of 0 is not more than the torque limit value in the accelerator opening level of 1. Similarly, when the starting elapsed time is the same, the torque limit value in the accelerator opening level 1 is not more than the torque limit value in the accelerator opening level 2, and the torque limit value in the accelerator opening level 2 is not more than the torque limit value in the accelerator opening level 3.

Figure 4:
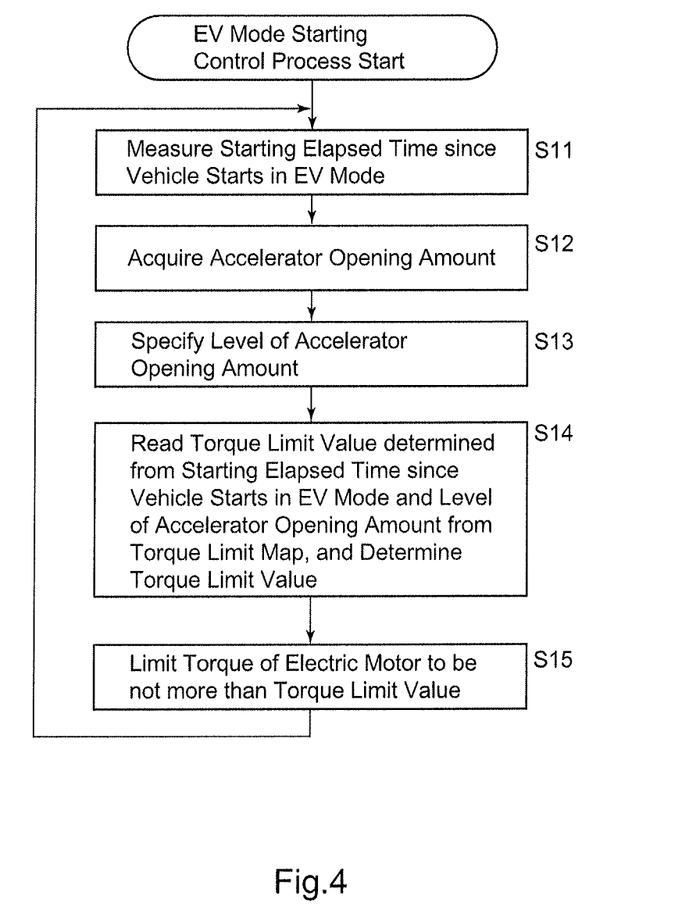
FIG. 4 is a flowchart for describing a process of a starting control in an EV mode.

FIG. 4 is a flowchart for describing a process of a starting control in the EV mode. In step S11, the elapsed time measurement unit 31 measures the starting elapsed time that is the time elapsed since the vehicle starts in the EV mode. When the mode is changed from the EV mode to another mode, such as the mode for driving the vehicle 1 only with the driving force of the engine 10, because the driver takes his/her foot off the accelerator pedal, the elapsed time measurement unit 31 measures the time elapsed since the vehicle 1 is again in the EV mode, and starts in the EV mode, as the starting elapsed time.

In step S12, the accelerator opening level specifying unit 32 acquires the amount of depressing the accelerator pedal by the driver, i.e., the accelerator opening amount information indicating the accelerator opening amount, thereby acquiring the accelerator opening amount. In step S13, the accelerator opening level specifying unit 32 specifies the level of the accelerator opening amount according to the current accelerator opening amount, out of the predetermined number of levels. For example, the accelerator opening level specifying unit 32 compares the threshold values, each indicating 35%, 60%, and 80%, stored therein and the acquired current accelerator opening amount. The accelerator opening level specifying unit 32 then specifies the accelerator opening level as 0 when the current accelerator opening amount is 0% to 34%, specifies the accelerator opening level as 1 when the current accelerator opening amount is 35% to 59%, specifies the accelerator opening level as 2 when the current accelerator opening amount is 60% to 79%, and specifies the accelerator opening level as 3 when the current accelerator opening amount is 80% or more.

For example, the accelerator opening level specifying unit 32 specifies the level of the accelerator opening amount by referring to the data of the threshold value for specifying the level of the accelerator opening amount in the torque limit map stored in the torque limit map storage unit 35.

In step S14, the torque limit value decision unit 33 reads the torque limit value determined by the starting elapsed time since the vehicle 1 starts in the EV mode, and the level of the accelerator opening amount, thereby deciding the torque limit value.

In this case, the torque limit value decision unit 33 may decide the torque limit value by applying a predetermined function to the starting elapsed time since the vehicle starts in the EV mode and the accelerator opening level.

Specifically, the torque limit value decision unit 33 decides the torque limit value of the electric motor 13 by the starting elapsed time and the accelerator opening amount instructed by the driver.

In step S14, the electric motor torque control unit 34 issues an instruction to control the electric motor 13 and the inverter 14 to the motor ECU 17, thereby controlling the electric motor 13 to generate the torque not more than the torque limit value. Then, the process returns to step S11, and the above-mentioned process is repeated. Specifically, in step S14, the electric motor torque control unit 34 controls the electric motor 13 to limit the torque of the electric motor 13 to be not more than the torque limit value.

Figure 5:
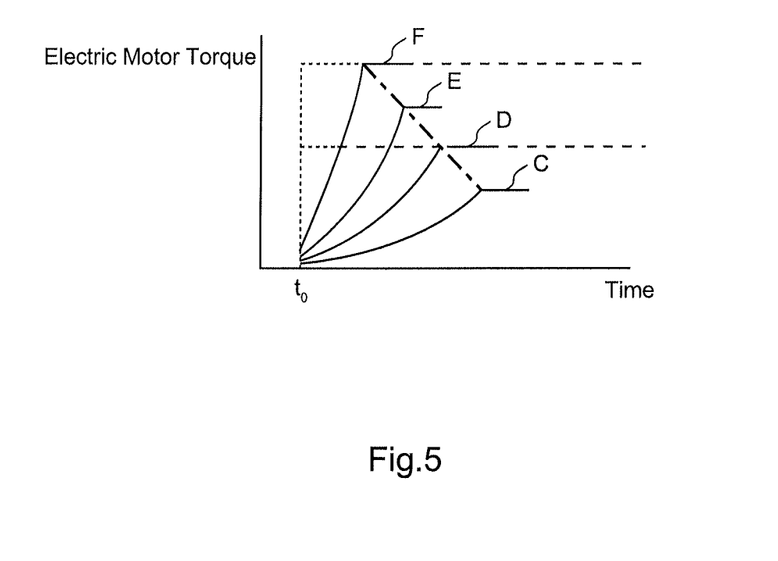
FIG. 5 is a view illustrating an example of torque generated by an electric motor 13 according to the starting elapsed time.

FIG. 5 is a view illustrating an example of torque generated by the electric motor 13 according to the starting elapsed time. In FIG. 5, a vertical axis indicates the torque of the electric motor 13, and a horizontal axis indicates the starting elapsed time.

C, D, E, and F in FIG. 5 indicate the torque generated by the electric motor 13 having the accelerator opening amount of 34%, the accelerator opening amount of 59%, the accelerator opening amount of 79%, and the accelerator opening amount of 100%, respectively when the vehicle starts on a time t0.

As described in FIG. 5, the torque of the electric motor 13 upon starting the vehicle 1 is limited by the time-series torque limit map according to the accelerator opening amount. Thus, when the accelerator opening amount is large, shock or surge can be suppressed, while increasing the acceleration as much as possible, and when the accelerator opening amount is small, a delicate speed control can be realized.

In other words, the acceleration upon starting the vehicle becomes continuous, so that smooth drivability can be realized, since jerk is considered for the torque rate. Since the torque rate is changed according to the accelerator opening amount, the controllability with slow speed is enhanced. The startability as a power performance and the drivability can both be attained. The vehicle can satisfy the acceleration required by the driver as much as possible, while reducing shock upon the start.

As described above, the torque required by the driver can smoothly be generated.

Figure 6:
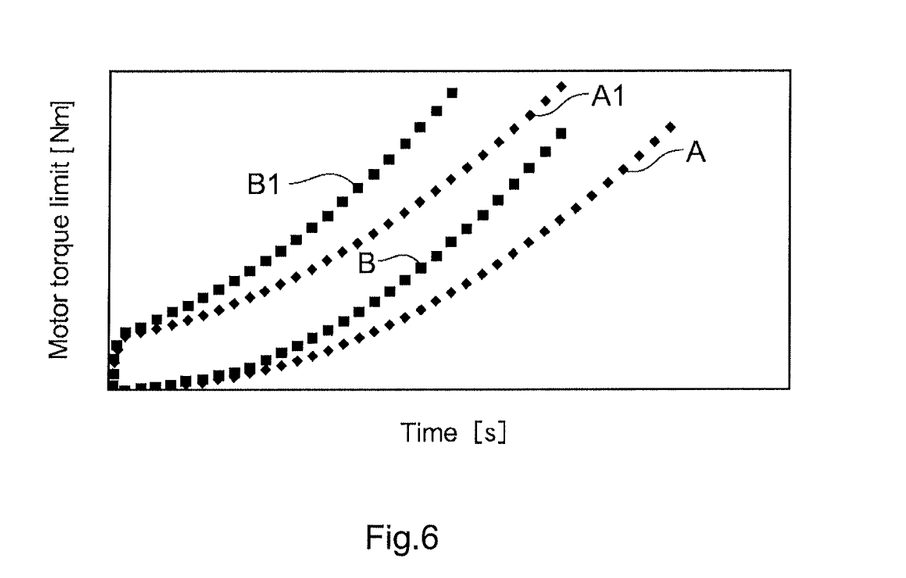
FIG. 6 is a view illustrating a change in a torque limit value to a starting elapsed time according to another embodiment.

In the embodiment described above, the torque limit value of the electric motor 13 gradually increases from 0 as illustrated in FIG. 3. However, as illustrated in FIG. 6, the torque limit value may sharply increase from 0 to a predetermined value, and then, gradually increase. For example, curves of the torque limit value formed by offsetting upward the curves A and B of the torque limit value illustrated in FIG. 3 are curves A1 and B1. When the total weight of the hybrid vehicle 1 is not less than a predetermined value, or when the angle of a road surface of a rising slope on which the hybrid vehicle 1 runs is not less than a predetermined value, there may be the case in which the vehicle 1 does not smoothly start due to the torque limit of the electric motor 13. When the rising slope is steep, for example, the hybrid vehicle 1 might slowly go back upon the start due to the torque limit of the electric motor 13. In order to prevent the situation described above, the torque limit value is set to be higher as indicated by the curves A1 and B1 in FIG. 6, if the rising slope is steep. When the total weight of the hybrid vehicle 1 is heavy, there may be the case in which the hybrid vehicle 1 can start only with very low speed due to the torque limit of the electric motor 13. In order to avoid the situation described above, the torque limit value is set to be higher as indicated by the curves A1 and B1 in FIG. 6, if the total weight of the hybrid vehicle 1 is heavy.

In this case, the torque limit value may manually be changed by the driver, or may automatically be changed in response to the detection of the total weight or the rising slope by the hybrid vehicle 1. The total weight of the hybrid vehicle 1 can be acquired in such a manner that an axle load sensor mounted to an axle measures a load on a load-carrying platform. Alternatively, the total weight of the hybrid vehicle 1 may be estimated by checking the behavior of the running hybrid vehicle 1 (see, for example, JP 2004-025956 A). The inclination of the road surface on which the hybrid vehicle 1 runs can be acquired by an inclination sensor.

The examples of the torque limit value in FIGS. 3 and 6 are created supposing that the hybrid vehicle 1 is a truck, and that the vehicle runs with the second speed (second) that is the normal gear number for starting the vehicle. On the other hand, when the vehicle starts with the first speed (low), the output torque from the transmission 16 becomes larger than the case of the second speed. Therefore, it is preferable that the torque limit value indicated by the curves A, B, A1, and B1 in FIGS. 3 and 6 is set smaller. In other words, the initial increase of the torque limit value is gentler than in the curves A, B, A1, and B1 in FIGS. 3 and 6. In this case, the torque limit value may manually be changed by the driver, or may automatically be changed according to the gear number (second or first).

On a slippery road such as a snowy road or mud, the torque limit value may be set to be small in order that the hybrid vehicle 1 can start slowly. In this case, the initial increase of the torque limit value is also gentler than in the curves A, B, A1, and B1 in FIGS. 3 and 6. In this case, the torque limit value may manually be changed by the driver, or may automatically be changed when an operation of an ABS (Antilock Brake System) is detected.

It is described above that the engine 10 is the internal combustion engine. However, the engine 10 may be a thermal engine including an external combustion engine. The present invention can be applied also to an electric vehicle.

The computer program executed by the hybrid ECU 18 is installed beforehand in the hybrid ECU 18 in the above description. However, a removable media on which the computer program is stored (that stores the computer program) may be attached to a drive not illustrated, and the computer program read from the removable media may be stored on the non-volatile memory in the hybrid ECU 18, or the computer program sent via a wired or wireless transfer medium may be received by a communication unit not illustrated, and stored in the non-volatile memory in the hybrid ECU 18, whereby the computer program may be installed to the hybrid ECU 18 that is a computer.

The respective ECUs may be realized by an ECU having some of these functions or all of these functions. Alternatively, an ECU having classified functions of each ECU may newly be provided.

The computer program executed by the computer may be a computer program by which the process is executed in a time-series manner according to the order described in the present specification, or may be a computer program by which the process is executed simultaneously, or on a necessary timing when called.

The embodiment of the present invention is not limited to the above-mentioned embodiment, and various modifications are possible without departing from the gist of the present invention.

The invention claimed is:

1. A vehicle comprising:
a power source including an electric motor which drives the vehicle and an electric control unit which controls at least the electric motor, in which;
the electric control unit comprises:
a measurement unit that measures, by a clock, a starting elapsed time that is a time elapsed after the vehicle starts, when the vehicle is driven only by power of the electric motor;
a decision unit that decides a limit value of torque of the electric motor based upon the starting elapsed time and an accelerator opening amount instructed by a driver; and
a control unit that controls the electric motor to limit the torque of the electric motor to be not more than the limit value,
wherein the decision unit decides the limit value based upon a level of the accelerator opening amount out of a predetermined number of levels and the starting elapsed time, and
wherein the limit value is decided larger when the level of the accelerator opening amount corresponds to a larger accelerator opening amount.

2. The vehicle according to claim 1, wherein the decision unit decides the limit value to be larger, as the starting elapsed time has elapsed.

3. The vehicle according to claim 1, further comprising:
a storage unit that stores the limit value in association with the starting elapsed time and the level of the accelerator opening amount,
wherein the control unit controls the electric motor in order that the torque of the electric motor becomes not more than the stored limit value associated with the starting elapsed time and the level of the accelerator opening amount.

4. A control method for a vehicle that is driven by a power source including an electric motor, the method comprising:
a measurement step for measuring, by an electronic control unit, a starting elapsed time that is a time elapsed after the vehicle starts, when the vehicle is driven only by power of the electric motor;
a decision step for deciding, by an electronic control unit, a limit value of torque of the electric motor based upon the starting elapsed time and an accelerator opening amount instructed by a driver; and
a control step for controlling the electric motor to limit the torque of the electric motor to be not more than the limit value,
wherein, in the decision step, the limit value is decided based upon a level of the accelerator opening amount out of a predetermined number of levels and the starting elapsed time, and
wherein, in the decision step, the limit value is decided larger when the level of the accelerator opening amount corresponds to a larger accelerator opening amount.

5. A computer program that causes a computer, which controls a vehicle that is driven by a power source including an electric motor, to execute:
a measurement step for measuring a starting elapsed time that is a time elapsed after the vehicle starts, when the vehicle is driven only by power of the electric motor;
a decision step for deciding a limit value of torque of the electric motor based upon the starting elapsed time and an accelerator opening amount instructed by a driver; and
a control step for controlling the electric motor to limit the torque of the electric motor to be not more than the limit value,
wherein, in the decision step, the limit value is decided based upon a level of the accelerator opening amount out of a predetermined number of levels and the starting elapsed time, and
wherein, in the decision step, the limit value is decided larger when the level of the accelerator opening amount corresponds to a larger accelerator opening amount.

\* \* \* \* \*